US012121015B2

(12) United States Patent
Lykken

(10) Patent No.: US 12,121,015 B2
(45) Date of Patent: *Oct. 22, 2024

(54) BAIT STATION SYSTEM

(71) Applicant: Kim Lykken, St. Cloud, MN (US)

(72) Inventor: Kim Lykken, St. Cloud, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,961

(22) Filed: Sep. 5, 2022

(65) Prior Publication Data

US 2023/0088297 A1 Mar. 23, 2023

Related U.S. Application Data

(63) Continuation of application No. 16/562,218, filed on Sep. 5, 2019, now Pat. No. 11,432,541, which is a continuation-in-part of application No. 16/383,526, filed on Apr. 12, 2019, now Pat. No. 11,425,898.

(60) Provisional application No. 62/656,526, filed on Apr. 12, 2018.

(51) Int. Cl.
*A01M 25/00* (2006.01)

(52) U.S. Cl.
CPC ................. *A01M 25/004* (2013.01)

(58) Field of Classification Search
CPC ... A01M 25/004; A01M 25/002; A01M 25/00
USPC ......................................................... 43/131
See application file for complete search history.

(56) References Cited

U.S. PATENT DOCUMENTS

| | | | | |
|---|---|---|---|---|
| 1,633,982 A | * | 6/1927 | Davis ................. | A01M 25/004 43/131 |
| 2,953,868 A | * | 9/1960 | Chambers ............... | A01M 1/20 43/131 |
| 3,008,262 A | * | 11/1961 | Ronicker ............ | A01M 25/004 43/131 |
| 3,488,879 A | * | 1/1970 | Laughlin ............. | A01M 25/004 43/131 |
| 3,772,820 A | * | 11/1973 | Bond .................. | A01M 25/008 43/131 |
| 4,208,829 A | * | 6/1980 | Manning ............. | A01M 25/004 43/131 |
| 4,550,525 A | * | 11/1985 | Baker ................. | A01M 25/004 43/131 |
| 4,630,392 A | * | 12/1986 | Ferraro ............... | A01M 25/004 43/131 |
| 4,782,622 A | * | 11/1988 | Roberts ................. | A01M 25/00 114/221 R |

(Continued)

FOREIGN PATENT DOCUMENTS

| | | | | |
|---|---|---|---|---|
| CA | 2978551 A1 | * | 2/2019 | ............. A01M 1/02 |
| CH | 219068 A | * | 2/1951 | |

(Continued)

*Primary Examiner* — Darren W Ark
(74) *Attorney, Agent, or Firm* — Skaar Ulbrich Macari, P.A.

(57) ABSTRACT

A tamper-proof bait station includes a container having a base and a lid that provides access to an interior that stores a poison bait that is consumed by pests. The base is securable to an external support member that supports the container above a ground surface. The support has an interior that is able to receive a weighted material to restrict movement of the container. A locking cap is provided that locks the lid to the base and is only removably upon applying axial or side pressure to the locking cap.

18 Claims, 16 Drawing Sheets

(56) References Cited

U.S. PATENT DOCUMENTS

| | | | | |
|---|---|---|---|---|
| 5,272,832 | A * | 12/1993 | Marshall | A01M 25/004 43/131 |
| 5,448,852 | A * | 9/1995 | Spragins | A01M 25/004 43/131 |
| 5,806,237 | A * | 9/1998 | Nelson | A01M 25/004 43/131 |
| 6,145,242 | A * | 11/2000 | Simpson | A01M 25/004 43/131 |
| 6,266,917 | B1 * | 7/2001 | Hight | A01M 1/2011 43/131 |
| 6,397,517 | B1 * | 6/2002 | Leyerle | A01M 23/24 43/88 |
| 6,470,622 | B1 * | 10/2002 | Braun | B65F 1/14 43/132.1 |
| 6,513,283 | B1 * | 2/2003 | Crossen | A01M 25/004 43/131 |
| 6,807,768 | B2 * | 10/2004 | Johnson | A01M 25/004 43/131 |
| 7,980,023 | B2 * | 7/2011 | Nelson | A01M 23/30 43/67 |
| 8,028,468 | B1 * | 10/2011 | Walsh | A01M 25/004 43/131 |
| 8,578,649 | B1 * | 11/2013 | Walsh | A01M 25/004 43/131 |
| 8,701,337 | B2 * | 4/2014 | Kay | A01M 25/004 43/131 |
| 8,701,594 | B2 * | 4/2014 | Vickery | A01M 25/004 119/51.01 |
| 8,800,201 | B2 * | 8/2014 | Vickery | A01M 25/002 43/131 |
| 9,532,564 | B1 * | 1/2017 | Walsh | A01M 25/004 |
| 9,538,741 | B1 * | 1/2017 | Walsh | F16M 11/10 |
| 9,663,068 | B1 * | 5/2017 | Sykora | B60R 99/00 |
| 10,561,139 | B1 * | 2/2020 | Suteerawanit | A01M 25/004 |
| 10,595,524 | B1 * | 3/2020 | Suteerawanit | A01M 31/002 |
| 11,425,898 | B2 * | 8/2022 | Lykken | A01M 25/004 |
| 11,432,541 | B2 * | 9/2022 | Lykken | A01M 25/004 |
| 2002/0043018 | A1 * | 4/2002 | Townsend | A01M 23/16 43/131 |
| 2005/0028431 | A1 * | 2/2005 | Hoyes | A01M 25/004 43/131 |
| 2009/0056199 | A1 * | 3/2009 | Reed | B29C 65/72 43/131 |
| 2009/0307963 | A1 * | 12/2009 | Abbas | A01M 25/004 43/131 |
| 2010/0031557 | A1 * | 2/2010 | Vickery | E05B 65/006 43/131 |
| 2011/0072709 | A1 * | 3/2011 | Patterson | A01M 23/30 43/131 |
| 2011/0226921 | A1 * | 9/2011 | Patterson | A01M 25/004 248/346.03 |
| 2016/0374326 | A1 * | 12/2016 | Azzarello | A01M 1/2011 43/131 |
| 2018/0116202 | A1 * | 5/2018 | Burger | A01M 25/004 |
| 2019/0313628 | A1 * | 10/2019 | Lykken | A01M 25/004 |
| 2019/0387733 | A1 * | 12/2019 | Lykken | A01M 25/004 |
| 2020/0337267 | A1 * | 10/2020 | Pyzyna | A01M 1/2005 |
| 2021/0015090 | A1 * | 1/2021 | Galloway | A01M 25/002 |

FOREIGN PATENT DOCUMENTS

| | | | | |
|---|---|---|---|---|
| DE | 802772 | C * | 2/1951 | |
| DE | 29519475 | U1 * | 4/1996 | |
| EP | 0388349 | A3 * | 3/1991 | |
| EP | 2719279 | A1 * | 4/2014 | ............ A01M 1/103 |
| EP | 3456198 | B1 * | 4/2020 | ............ A01M 23/24 |
| FR | 3092966 | A1 * | 8/2020 | .......... A01M 25/004 |
| KR | 100819748 | B1 * | 4/2008 | |
| KR | 20110041999 | A * | 4/2011 | |
| WO | WO-2009056817 | A2 * | 5/2009 | .......... A01M 25/004 |
| WO | WO-2017031056 | A1 * | 2/2017 | .......... A01M 25/004 |
| WO | WO-2020205881 | A1 * | 10/2020 | .......... A01M 25/004 |

\* cited by examiner

BAIT STATION SYSTEM

PRIORITY

This application is a continuation of U.S. patent application Ser. No. 16/562,218, filed Sep. 5, 2019, which is a continuation-in-part of U.S. patent application Ser. No. 16/383,526 filed Apr. 12, 2019, which claims priority to U.S. Provisional Application No. 62/656,526, filed Apr. 12, 2018, the entire disclosures of which are hereby incorporated by reference herein.

FIELD

The present invention relates generally to bait stations, more particularly, to bait station system that can be conveniently weighted to prevent its unintended movement from a location.

BACKGROUND

It is common for rodents and other pests to infiltrate buildings or structures seeking shelter and foodstuffs. Throughout history attempts have been made to control and reduce the rodent or pest population. The most effective method has been and continues to be the use of a poison that is lethal to the pest. Unfortunately, these poisons are also attractive to other animals such as pets, livestock and desirable wildlife. In order to prevent the unintentional poisoning of other animals, the poison is typically placed into a container that restricts its access to the pests or rodents that are typically smaller in size. The rodents and pests are attracted to the poison, which is typically combined, impregnated or mixed with the food. The rodents and pests enter the container where they ingest the poison, which causes their termination.

The conventional containers used for housing the poisoned bait have numerous drawbacks. First, they are light and can be carried away by larger animals such as dogs or racoons. If they are removed from their intended location the treatment fails to be effective. Secondly, weighted bait stations have been invented but use heavy ballasts that must be stored and carried with the bait station between jobs or pest control sites. Lastly, in order to prevent children from coming into contact with the poison many conventional containers require a key to open the container for refilling purposes. The problem with using keys is that they can become lost or useless if the key opening becomes filled with snow, dirt or debris.

In all of the devices available or described a need has remained for an improved bait station that is not easily removed by animals and one that may be easily opened without a key while preventing children from coming into contact with the poison bait.

SUMMARY

A tamper-proof bait station system of the present invention includes a container having a base and a lid or cover that provides access to an interior of the container that is adapted to store a poison bait or other pest capturing devices. The invention also includes an external support member or receptacle that supports the container above a ground surface. The container includes one or more pest ramps that have access openings to permit rodents or pests access to the interior of the container and the poison bait.

The support member or receptacle includes a collar that extends through an opening in the base of the container. A cap is securable to the collar to secure the container to the support member. The lid of the container covers and protects the bait and the cap of the support member or receptacle.

The cap of the support member allows a user to place a weighted material into an interior of the support to weigh down and prevent an animal from removing the bait station from a desired location being treated for rodent or pest infestation.

The lid and base include latch portions that are able to mate together when the lid is closed. The latch portions can be threaded such that a child proof cap is threaded thereto and is only removable upon applying a force either axially or laterally to the cap. It is another feature of the present invention to provide a tamper-proof assembly that does not require a key for accessing an interior of the bait station.

Further objects, features and advantages of the invention will be apparent from the following detailed description when taken in conjunction with the accompanying drawings.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
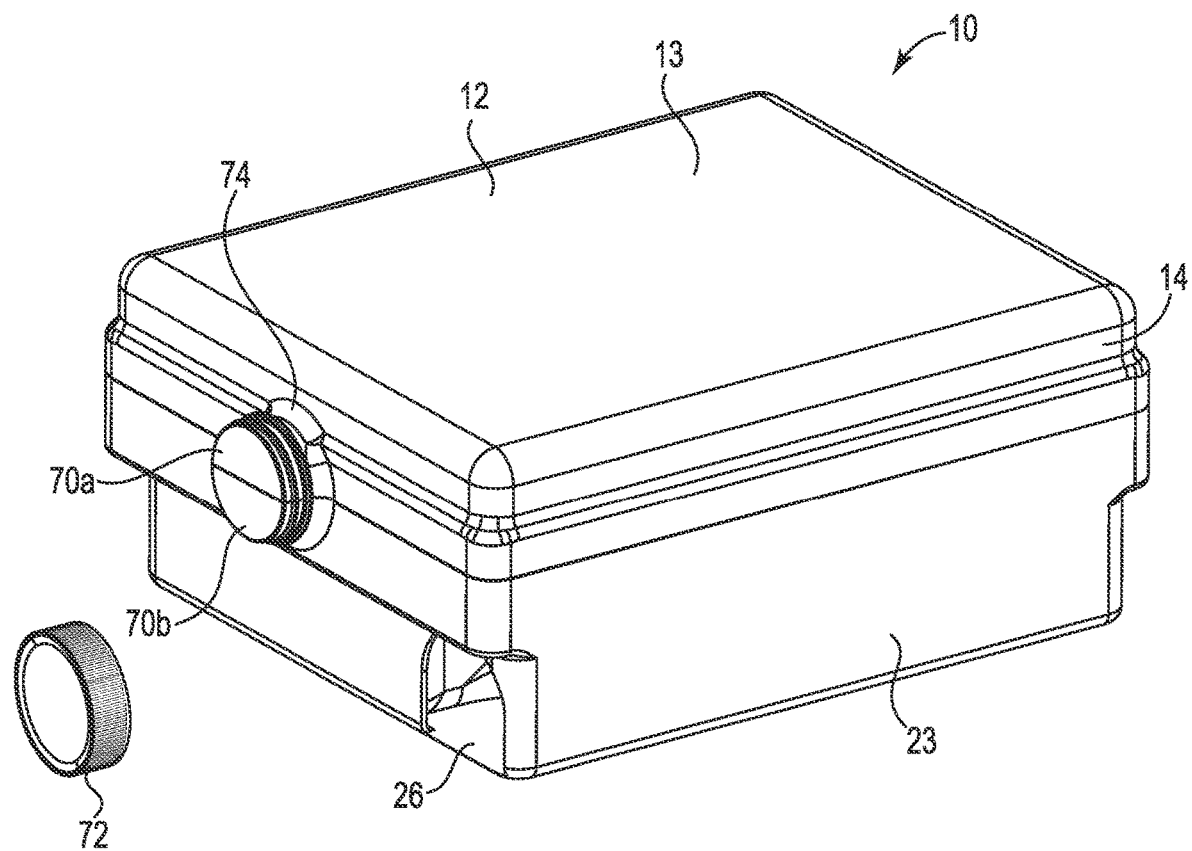
FIG. 1 is a perspective view of the bait station system according to an example embodiment.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Dimensions and relative proportions of components are merely example embodiments and can be varied unless specifically limited in a given claim. Thus, the dimensions can be varied without departing from the scope of the invention.

As illustrated in FIGS. 1-19, the present invention of a bait station system, assembly and method 10 includes a container 11 having a cover or lid 12 having a top 13 with downwardly extending side walls 14. As particularly illustrated in FIGS. 3 and 8, a bottom surface 15 of the top 13 may have one or more upper divider walls 16 extending downwardly therefrom that are used to divide a portion of the interior of the bait station 10. In one example embodiment, the side walls 14 may terminate in a groove 17 that is releasably mateable with a portion of a base 20 of the container 11 of the bait station 10. In another example embodiment of the invention, the cover or lid 12 may be hingedly coupled to a portion of the base 20. Any hinge mechanism may be used including living hinges or knuckle and pin hinges. The hinge may be added to or molded into the cover or lid 12 and base 20 during the manufacturing process.

Figure 2:
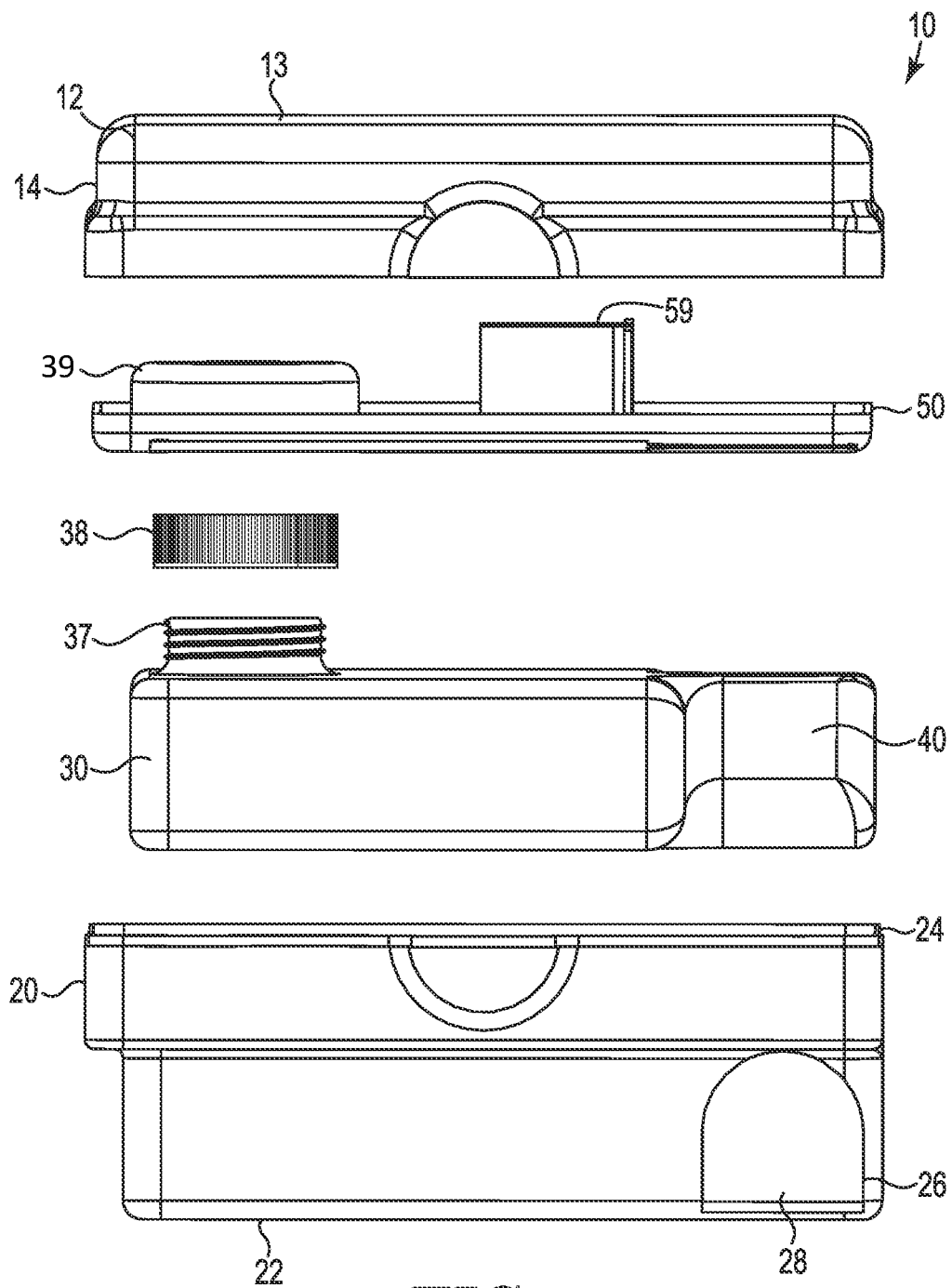
FIG. 2 is an exploded view of the bait station system according to an example embodiment of the invention.
Figure 3:
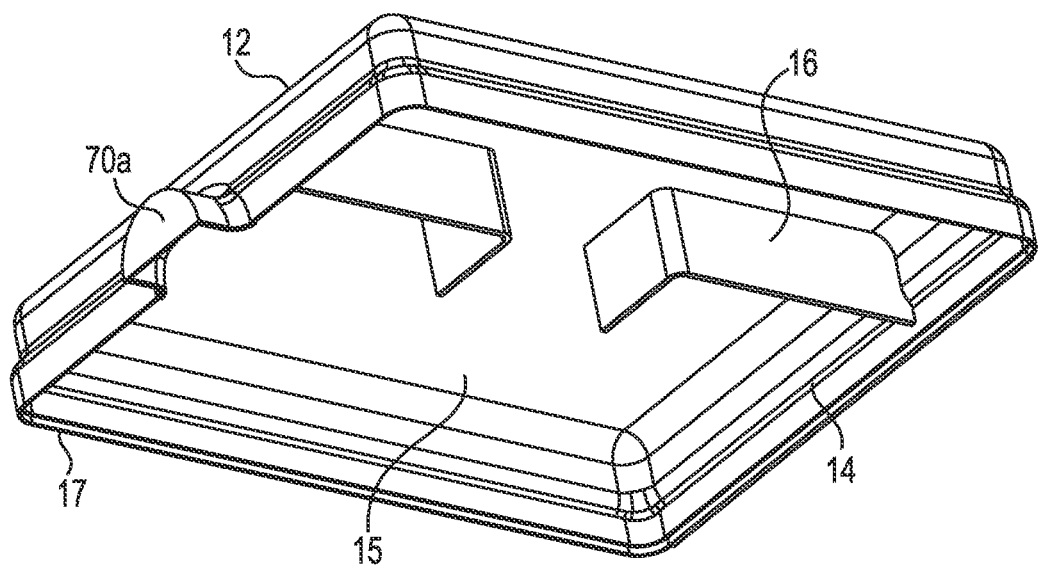
FIG. 3 is a bottom perspective view of a cover of the bait station according to an example embodiment.
Figure 4:
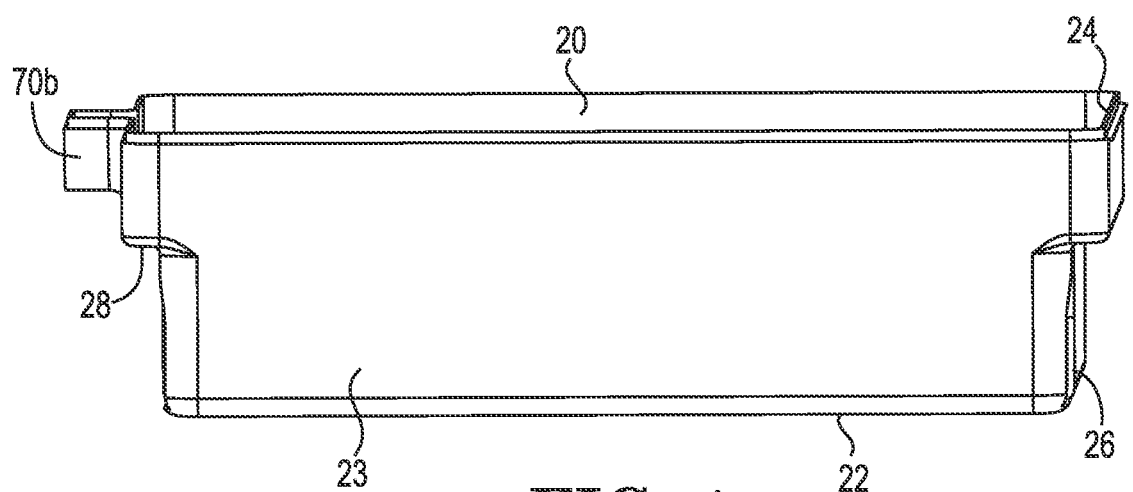
FIG. 4 is a perspective view of a base of the bait station according to an example embodiment.
Figure 8:
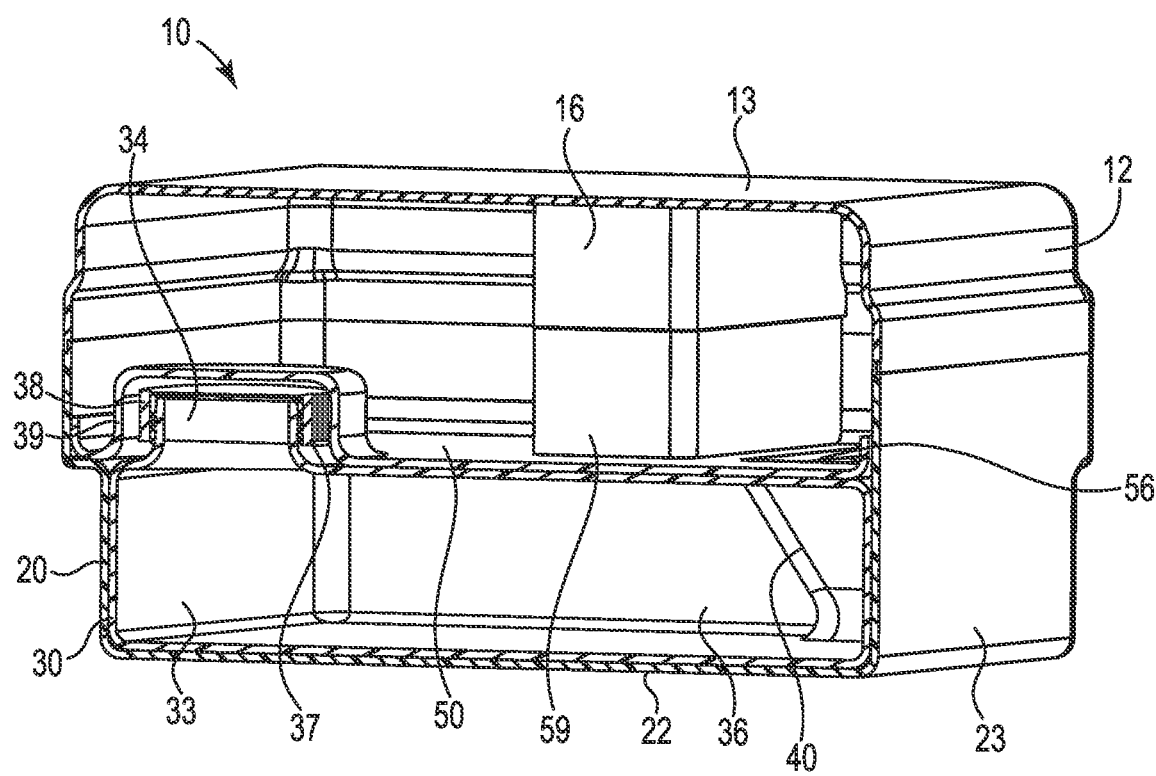
FIG. 8 is a cross sectional view of the assembled base station system according to an example embodiment of the invention.

As particularly illustrated in FIGS. 2, 4 and 8, the base 20 of the bait station 10 includes a bottom 22 with upwardly extending side walls 23. The side walls 23 of the base 20 may have a lip or edge 24 that is removably positionable in the groove 17 of the cover or lid 12. Other mating features are also possible. For example, a gasket may be positioned in the groove 17 of the cover or lid and abuttable against the lip 24 of the base 20. The gasket may be used to provide a seal against intrusion of moisture other environmental conditions into the interior of the bait station system 10.

In another example embodiment of the invention, the side walls 14 and 23 of the cover or lid 12 and base 20, respectively, may abut each other with a skirt portion of the lid 12 extending generally downward beyond where the lid 12 and base 20 abut. The skirt portion of the lid 12 acts to prevent the intrusion of moisture and other environmental conditions into the interior of the bait station system 10.

One or more of the side walls 23 of the base 20 can have one or more openings 26 extending therethrough to permit rodents and pests access to an interior 28 of the bait station 10. The openings 26 may be positioned anywhere in the side walls 23. The openings 26 may also have any shape or size to accommodate rodents or pests of varying sizes.

As illustrated in FIGS. 2, 5A, 5B, and 8, the bait station system 10 includes a support member, receptacle or reservoir 30 having an outer wall or casing that defines an interior 36 thereof. The support member, receptacle or reservoir 30 may be removably positioned in the interior 28 of the base 20. The support member, receptacle or reservoir 30 may be used to receive a fill material in order to add additional weight to the bait station 10. The outer wall of the support member, receptacle or reservoir 30 generally includes a top 31 and bottom 32 spanned by a peripheral wall 33. The support member, receptacle or reservoir 30 may include an access opening 34 that provides access to the interior 36 of the support member, receptacle or reservoir 30. The receptacle 30 may be filled with any weighting material, such as water, sand, gravel, dirt, cement and the like that is capable of adding weight to the bait station 10. In one example, the receptacle 30 is configured to hold a volume of one gallon of a fluid such as water or an equivalent volume of a solid matter. However, the receptacle 30 can have a larger or smaller volume and the foregoing should not be considered limiting.

In one example embodiment of the invention, the material used to fill the receptacle 30 may be changed depending upon the season or conditions as a means of attracting rodents or pests. For example, in warmer conditions the material may be any material that is able to maintain or emit a temperature cooler than the surroundings. This creates a cooler internal temperature in the bait station 10 that will be attractive to rodents or pests. Likewise, in cooler conditions, the material may be any material that is able to maintain or emit warmer temperatures than the surroundings. This material will increase a temperature in the bait station thus attracting rodents or pests. As briefly described above, the materials may include but are not limited to water, sand, cement, silicon, sulfate, calcium or other materials that may be selectable based upon their thermal properties.

Heating or cooling the interior 28 of the bait station 10 may also be accomplished by any means that is able to generate a warm or cool interior environment. For example, a power source such as a battery or a solar panel may be used to provide power to a thermoelectric device that operates under the Peltier Effect. Other means of heating and cooler are also possible and should be considered to be within the spirit and scope of the invention.

Figure 5A:
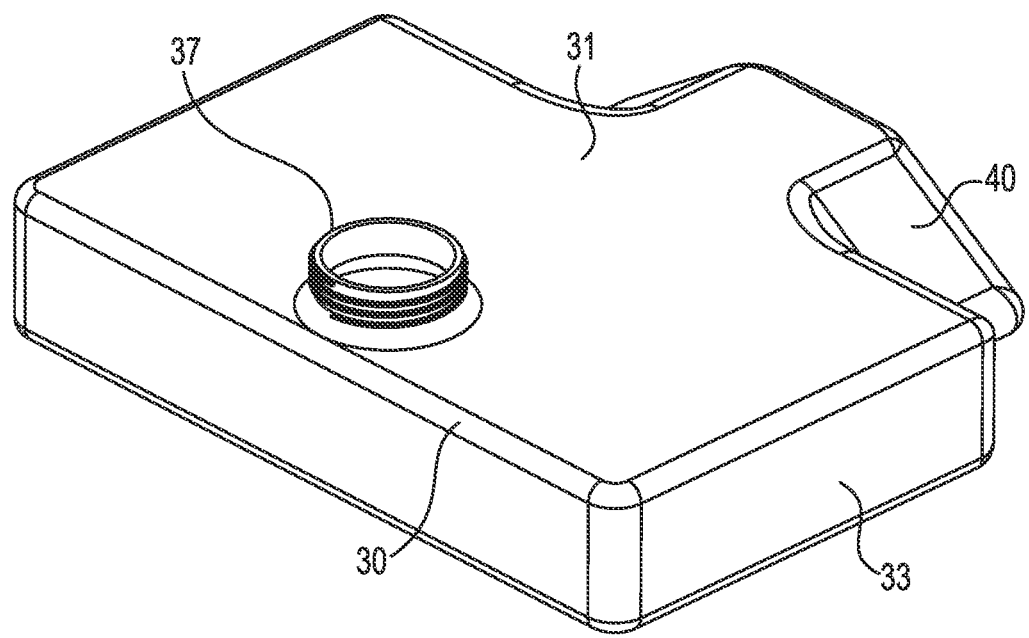
FIGS. 5A and 5B are perspective views of a receptacle of the bait station according to an example embodiment.
Figure 5B:
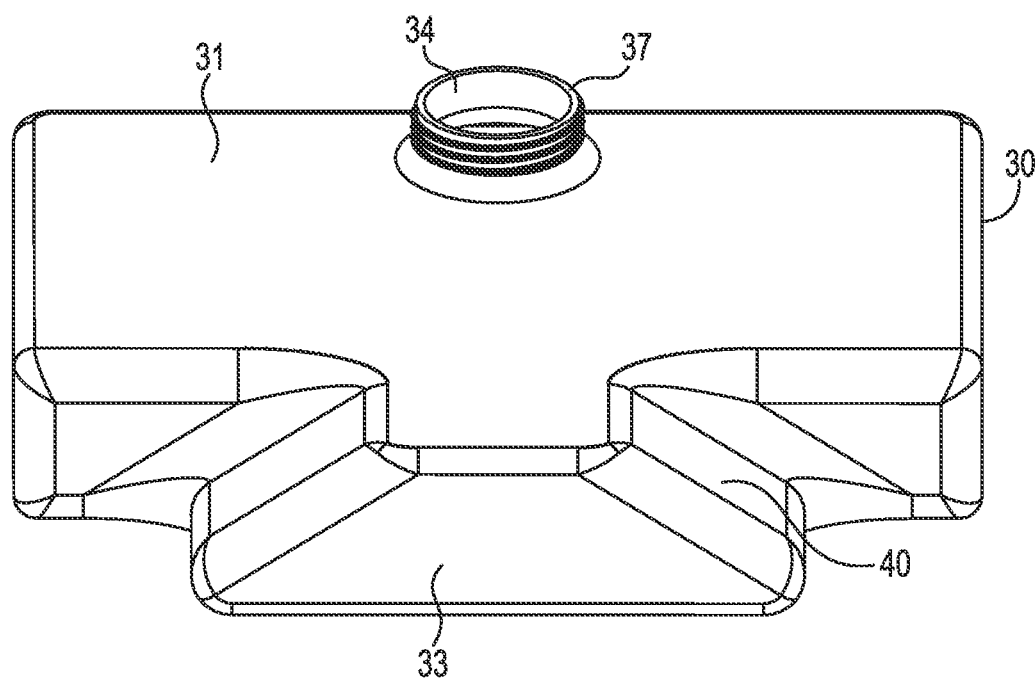

In an example embodiment of the invention, as particularly illustrated in FIGS. 5A and 5B, a threaded neck or collar 37 may extend from the top 31 of the receptacle 30 about the opening 34. A cap 38 may be removably coupled or threaded to the threaded neck 37 to selectively close the opening 34. The inner recess of the cap 38 can be provided with grooves that correspond to the threads of the neck 37. In one embodiment, the threads of the cap 38 and neck 37 can be configured to create a "child-proof" closure where the user must apply downward force and then turn the cap counterclockwise while maintaining the downward force in order to release the cap 38.

Other interior 36 closure mechanisms are also possible. For instance, a plug or similar plugging or blocking device may be used to block the access opening 34. A latch or hatch may also be used to close the interior 36 of the receptacle 30.

In an example embodiment of the invention, the receptacle 30 may include a volume measurement marking or portion used to determine an ideal maximum volume of a liquid in the receptacle 30. The volume measurement marking or portion may comprise a tab extending inwardly into the interior of the receptacle 30. The tab may include a marking such as a line or similar indicia. The volume measurement marking or portion can be positioned proximate to the access opening 34 such that it is visible to a user looking into the interior of the receptacle 30. When a liquid is placed into the receptacle up to the volume measurement marking or portion it creates a gap between a top of the liquid and top 31 or cap 38 of the receptacle 30. The gap creates a space for receiving the liquid as it expands, such as during freezing temperatures.

As illustrated in the FIG. 8, the receptacle 30 may be removably positionable in the base 20. As particularly illustrated in FIGS. 5A, 5B and 8, receptacle 30 may include a ramp or inclined portion 40 that is positionable proximate the opening 26 of the base 20. The ramp or inclined portion 40 may be formed in the peripheral wall 33 of the receptacle 30. Multiple ramp or inclined portions 40 may be formed in the receptacle 30 and positioned adjacent to openings 26 in the base 20. In one example embodiment, poison may be placed on the top 31 of the receptacle such that rodents may climb the inclined portion 40 to access and consume the poison.

It should be appreciated that the receptacle feature is advantageous because it reduces or eliminates the need of the user to transport a heavy object that would be used to weigh down a conventional pest trap. Instead of a concrete or metal bloc, the use can simply fill the receptacle with water, sand grave, dirt, etc. Thus, the bait station 10 need not be secured to a separate anchor, so that is a cost and time savings. The fill material in the enclosure can also be easily removed by removing the cap and dumping the contents. This makes transporting previously-deployed traps easy and convenient.

Figure 6:
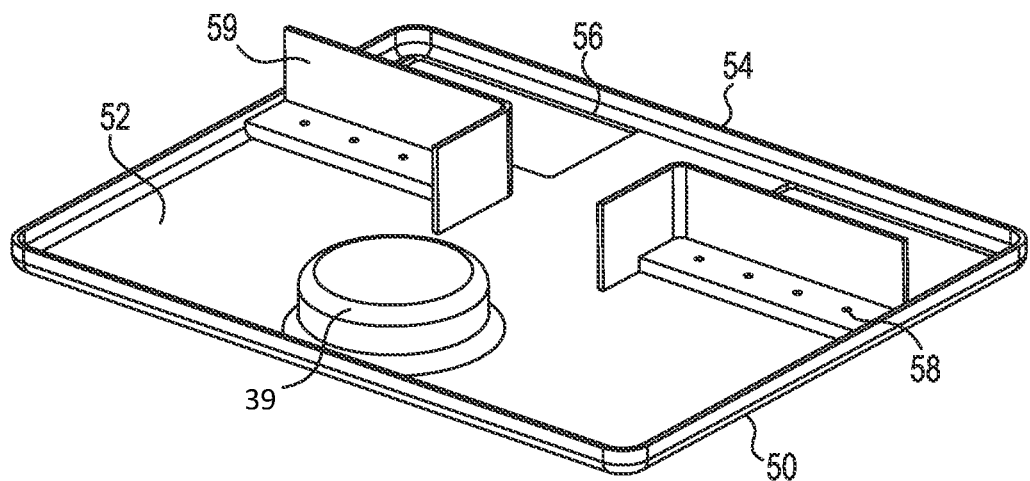
FIG. 6 is a perspective view of a tray of the bait station according to an example embodiment.
Figure 7:
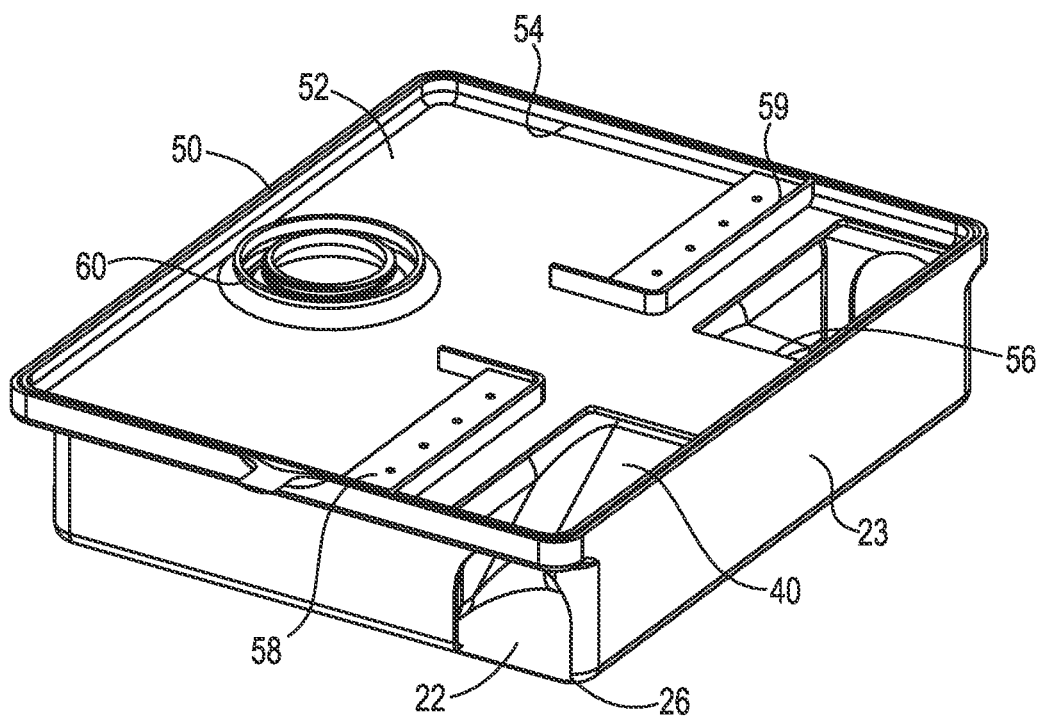
FIG. 7 is a perspective view of the receptacle positioned between the tray and base of the bait station according to an example embodiment.

In another example embodiment of the present invention, as particularly illustrated in FIG. 7, a support tray 50 can be removably positioned or fixed on the receptacle 30 in the bait station 10. The support tray 50 can hold, support, or retain the poison bait for the rodents and can also form a rodent path within the bait station 10. As illustrated in FIGS. 6 and 7, the tray 50 has a support surface 52 for supporting or holding the poison and rodents entering the bait station 10. In one embodiment, the support tray 50 may also include a perimeter wall or lip 54 extending upwardly to maintain the poison bait on the support surface 52. The support surface 52 generally has one or more openings 56 positioned or positionable near a top of inclined portions or ramps 40. Rodents climbing the ramps 40 pass through the openings 56 to access and consume the poison.

The support surface 52 may also include one or more holes 58 extending therethrough that are capable of receiving pins 90 or other securing devices that are used to secure the poison 92 to the tray 50. The pins 90 may be insertable up through the support surface 52 and the poison inserted onto the pins. The pins 90 may extend any distance from the support surface 52 of the tray 50 to the bottom surface 15 of the cover 12. The support surface 52 of the tray 50 may have one or more elevated portions on which the poison sits in order to permit a portion of the pins 90 to be seated in the support surface 52 of the tray 50 and to prevent interference between the pins and the receptacle 30.

Additionally, the tray 50 may include one or more lower divider walls 59 extending upwardly from the support surface 52 to further divide the interior formed between the cover or lid 12 and the support tray 50 seated on the base 20, to create a path for the rodents or pests, and to make it difficult for rodents or pests to remove the poison bait from the bait station 10. As particularly illustrated in FIG. 8, the lower divider walls 59 may be adjacent to or abut the upper divider walls 16 of the cover or lid 12. In another embodiment of the invention, the lower divider walls 59 or the upper divider walls 16 may have a height such that they extend or span a distance between the support surface 52 and the cover or lid 12, when the cover 12 is in a closed position.

As illustrated in FIG. 7, the support surface 52 of the tray 50 may have an aperture 60 extending through a portion of it that is capable of receiving the threaded neck 37 of the support member or receptacle 30. The cap 38 may be threaded onto the threaded neck 37 such that the support tray 50 is at least temporarily fixed or secured to the support member or receptacle 30. In yet another embodiment, the aperture 60 is larger than the cap 38 permitting the cap 38 to freely pass through it.

In another example embodiment of the invention, the support surface 52 of the tray 50 may have cover portion 39, formed therein during the molding process that covers the access opening 34 or cap 38. The cover portion 39 can extend upwardly from the support surface 52 to define a recess adapted to receive the neck portion 37 and/or cap 38. The cover portion 39 protects the access opening 34 and cap 38, if provided, from coming into contact with debris and other material brought into the bait station 10 or created by the rodents while they are in the bait station 10.

Figure 9:
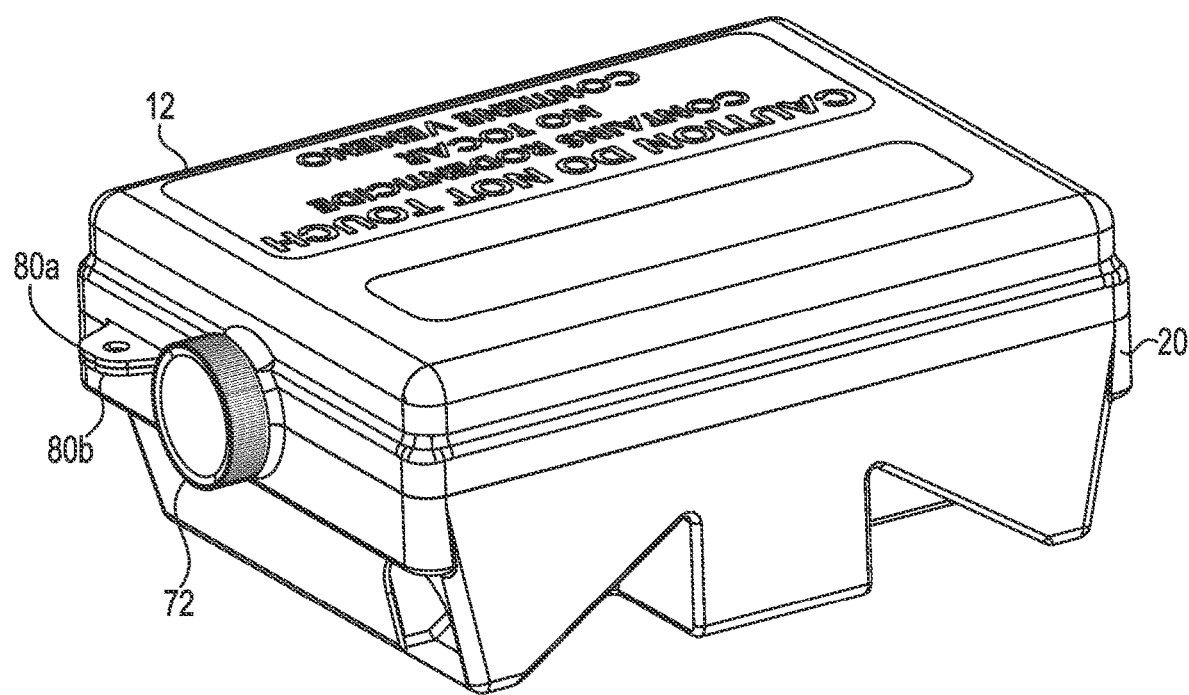
FIG. 9 is a perspective view of the assembled base station system with a cap or cover coupled thereto.
Figure 10:
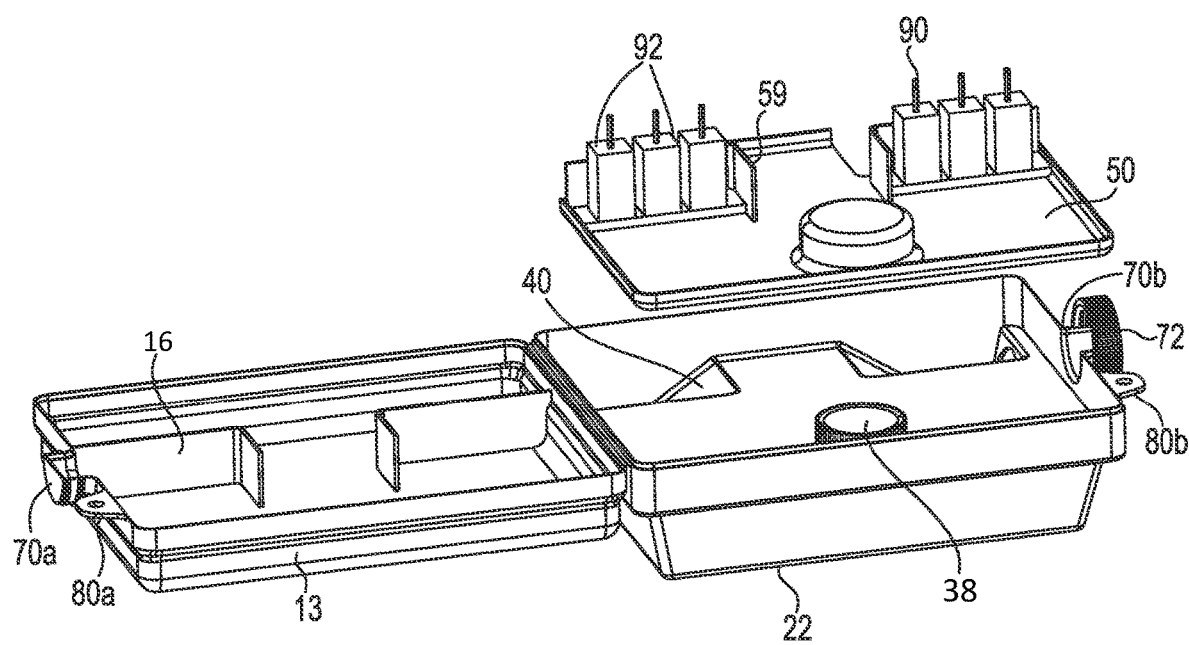
FIG. 10 is a perspective view of the assembled base station system with bait disposed on in the base station.
Figure 11:
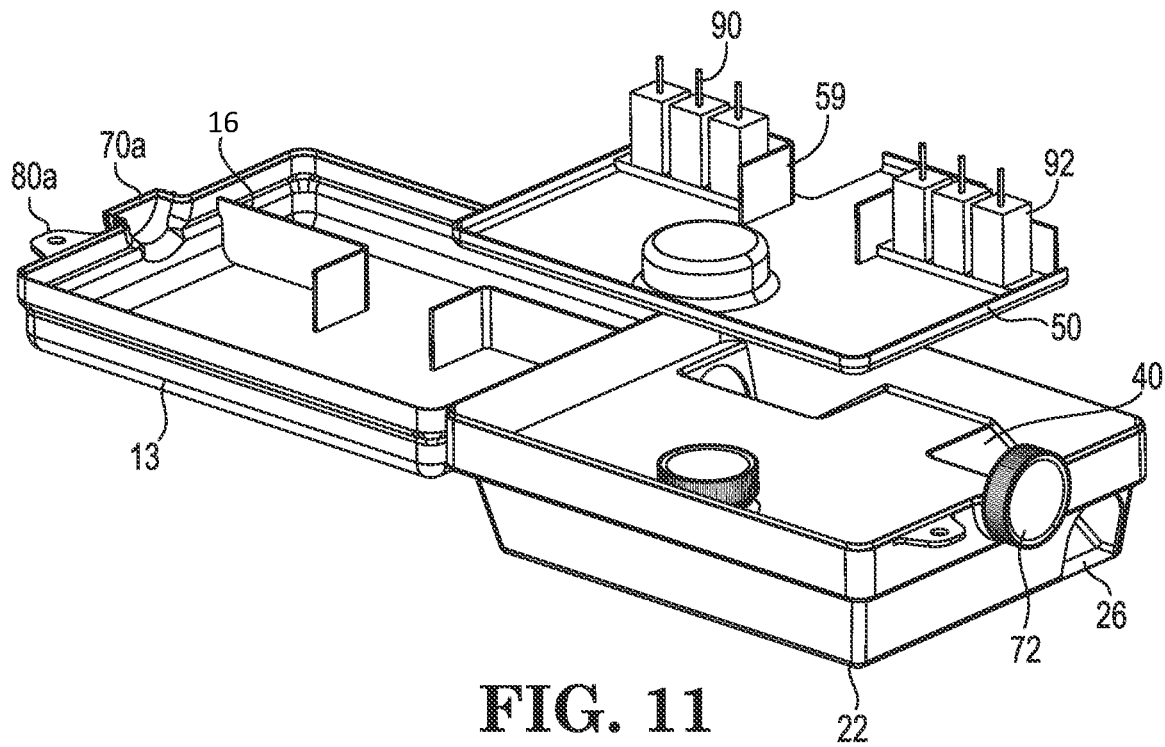
FIG. 11 is an exploded perspective view of a base station system in accordance with an example embodiment of the invention.
Figure 12:
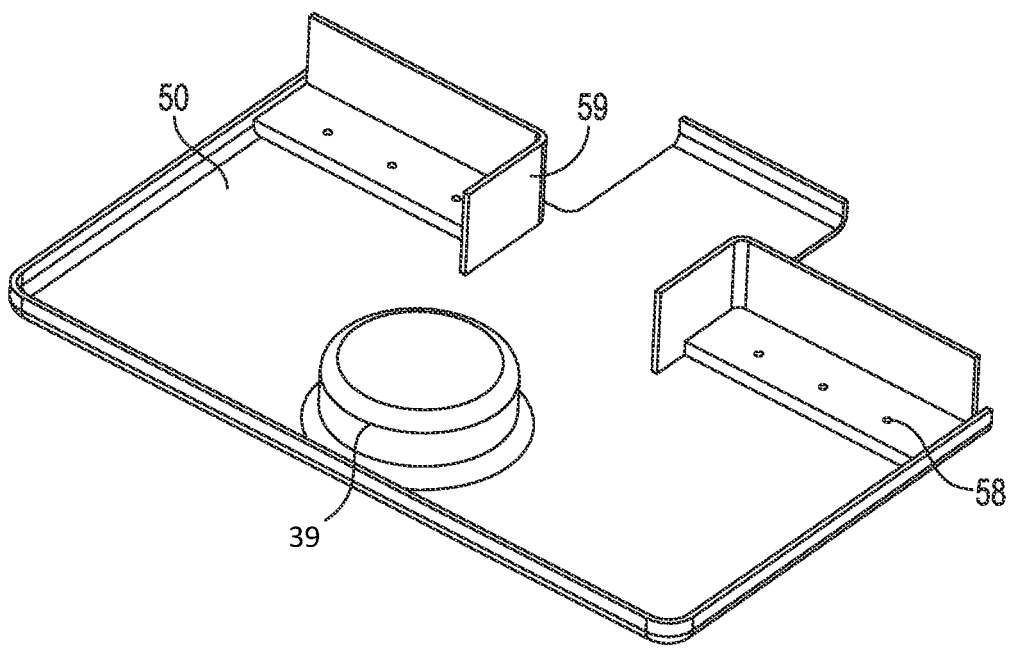
FIG. 12 is tray of a bait station system in accordance with an example embodiment of the invention.
Figure 13:
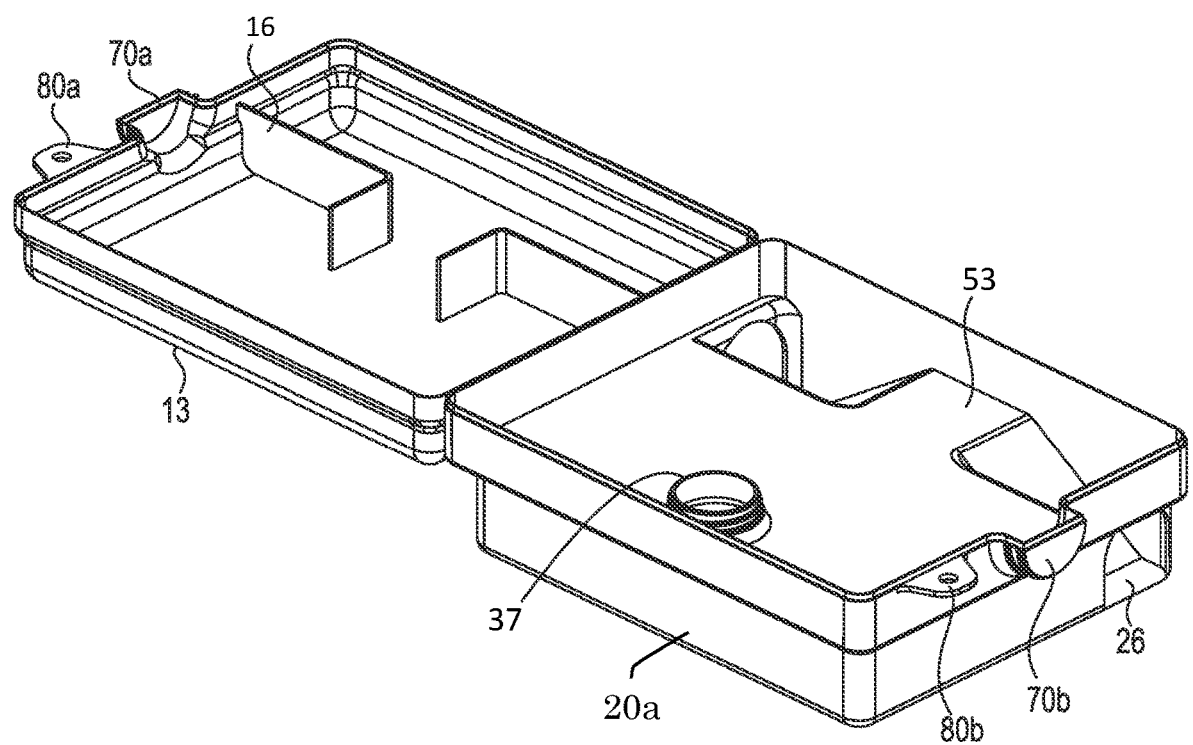
FIG. 13 is a bait station system having a hinged lid coupled to a reservoir bottom in accordance with an example embodiment of the invention.
Figure 14:
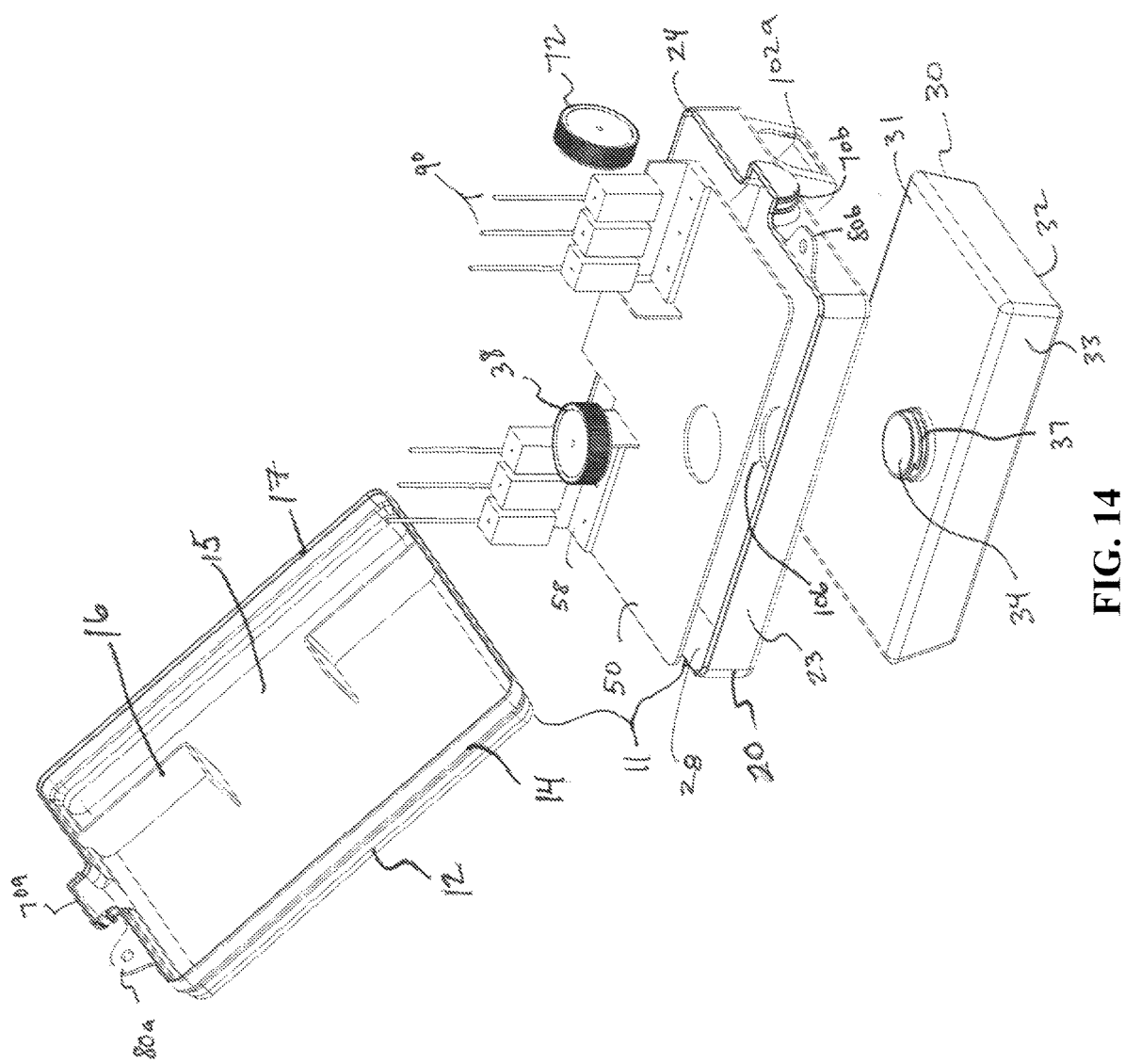
FIG. 14 is an exploded view of a bait station system having an external weighted reservoir member in accordance with an example embodiment of the invention.

In another embodiment of the invention, as illustrated in FIGS. 1 and 9-10, the sidewall 14 of the cover 12 and the sidewall 23 of the base 20 have outwardly extending mating or abutting latch portions 70a and 70b. The latch portions 70a and 70b can be latched or secured together by a securing mechanism to prevent separating the cover or lid 12 from the base 20. The latch portions 70a and 70b may have external threaded surfaces. In one embodiment, the securing mechanism may comprise a locking cap or cover 72 threaded onto the latch portions 70a and 70b to prevent their separation. Similar to medicine bottles, the locking cap 72 may resist unthreading absent the application of a force that is axial to a rotational movement or pressed upon the sides of the locking cap. In one example embodiment, the cover or lid 12 and/or base 20 may include a catch 74 capable of engaging ridges on an outer surface of the locking cap 72. The catch 74 prevents a child from removing the locking cap 72 and accessing the poison bait.

In an example embodiment of the present invention, the side walls of the cover or lid 12 and the base 20 may have outwardly extending tab portions 80a and 80b that are abuttable or positionable proximate to each other when the lid 12 is in a closed position. The tab portions 80a and 80b can have holes extending therethrough for receiving a lock or other securement device capable of preventing separation or opening of the cover or lid 12 from the base 20 and exposing the interior of the container 11 and the poison bait contained therein.

In yet another example embodiment of the invention, as illustrated in FIGS. 10-13, the base 20 of the container 11 includes a top wall 53 such that the base 20 forms a tank 20a having an interior that is separate from the interior of the bait station 10. The tank 20a is able to receive a volume of material such as water or sand. The support tray 50 may be removably positioned on the top wall 53 of the tank 20a. As described above, the support tray 50 can include bait or poison holding areas designed to keep the poison bait within the interior of the container 11. The bait or poison 92 may be secured by pins 90 that may be secured in the openings or holes 58 formed in the top of the base 20. The bait or poison 92 can be replaced or refilled by opening the lid or cover 12 and placing the poison 92 on the pins 90. As an animal or rodent enters the ramp or incline 40 it can access the poison 92 but it restricted from removing the poison 92 by the pins 90.

The ramps 40 of the tank 20a are used for rodents or pests to access the interior of the bait station 10 without entering the interior of the tank 20. The ramps 40 may be formed in the side walls 22, or the side walls 22 and bottom 22, of the tank 20a. As previously described, an access opening 34 and cap 38 may also be used to enclose the interior of the tank 20a. Materials capable of adding weight to the tank 20a may be introduced through the access opening 34 and secured with the cap 38.

In another example embodiment of the invention, the top wall 53 of the tank 20a is the bait or poison staging area and there is no separate tray 50. The top wall 53 of the tank 20a may include the divider walls 59 extending upwardly therefrom to define the poison holding areas and to aid in preventing a rodent from removing the poison 92 from the station 10. The lower divider walls 59 also restrict or prevent children and pets from accessing the poison bait from outside of the container 11.

In yet another example embodiment of the present invention, a width of the base 20 may generally taper from the cover or lid 12 toward the bottom 22. The tapered base 20 enables the bait station 10 to be easily removed from snow or ice. Additionally, as snow or ice falls, expands or contracts, the tapered base 20 causes the base station 10 to be pushed upwardly and not become frozen into or to the ground or surface supporting the bait station 10.

Referring to FIG. 9, a side wall 23 and bottom 23 of the base 20 may include one or more expansion gaps that permit the expansion or accumulation of snow or ice coming into contact with the base 20. The expansion gaps can include one or more grooves, channels, cut-outs and the like.

Referring to FIGS. 14-19, the bait station system 10 can have an external support member or weighted receptacle 30 that is able to support the base 20 generally above the ground surface. As particularly illustrated in FIGS. 14 and 15, since the base 20 is supported above the support member or receptacle 30, the base 20 includes one or more ramps 100a and 100b that extend in a downwardly direction between the bottom 22 of the base 20 and the ground surface. The ramps 100a and 100b can have openings 102a and 102b, respectively, which provide access for the pest or rodent to reach the support tray 50 and the poison bait supported thereon.

The ramps 100a and 100b are positioned proximate to one of the side walls 23 of the base 20 so that they can extend downwardly next to the support member or receptacle 30. Although two ramps are illustrated, it should be appreciated that any number of ramps in any location and configuration are contemplated herein and should be considered to be within the spirit and scope of the invention.

Figure 15:
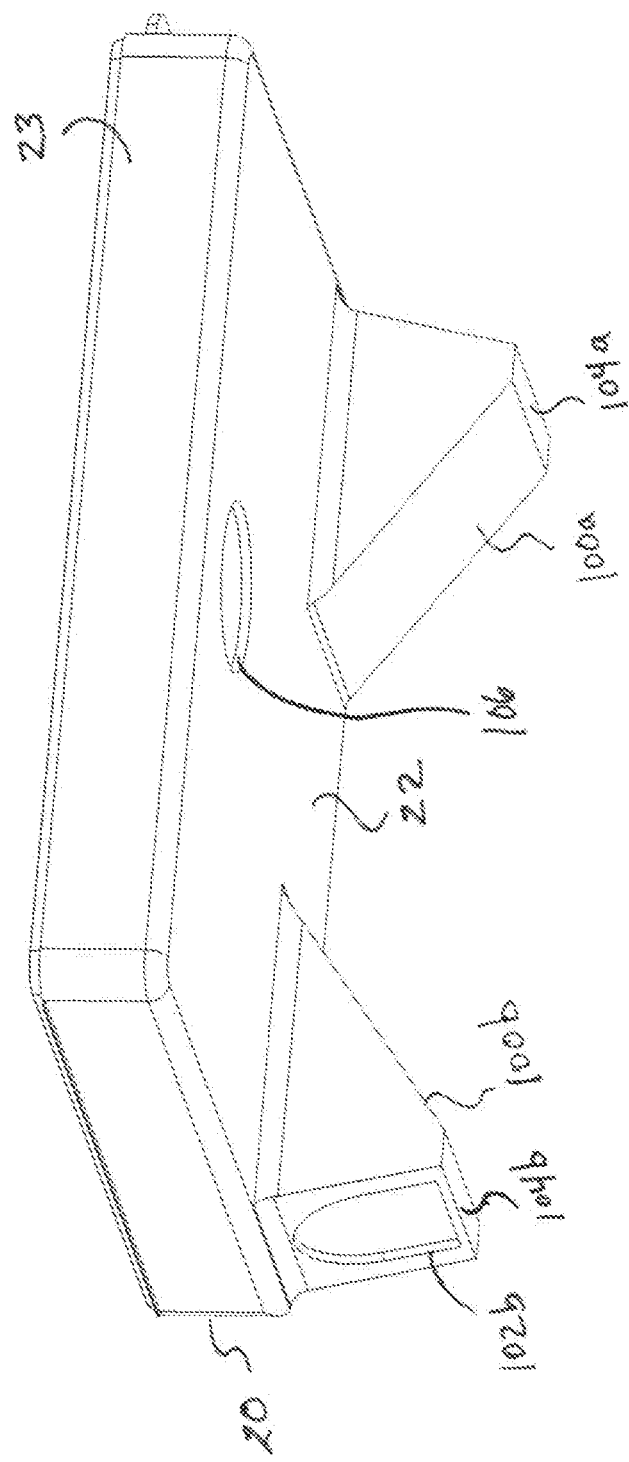
FIG. 15 is a perspective view of a bottom of a bait station system having an external weighted reservoir member in accordance with an example embodiment of the invention.

As particularly illustrated in FIG. 15, the ramps 100a and 100b can include support portions or surfaces 104a and 104b proximate the openings 102a and 102b. The support surfaces 104a and 104b are generally planar in shape and act to support a portion of the base 20 above the ground surface. The support surfaces 104a and 104b can be rough or generally non-planar to assist in reducing or preventing freezing of the base 20 to the ground surface. Similarly, a bottom or lower surface 32 of the external support member or receptacle 30 may be rough, textured or generally non-planar to assist in reducing or preventing freezing of the support member or receptacle 30 to the ground surface.

The external support member or receptacle 30 can be releaseably coupled to a portion of the base 20 such that the base 20 is supported above the ground surface. In one example embodiment of the invention, the base 20 includes an opening 106 for receiving the neck portion 37 of the external support member or receptacle 30. The neck portion 37 of the external support member or receptacle 30 is also extendable through the opening 60 the in support tray 50. The cap 38 may be threaded onto the neck portion 37 to selectively couple the external support member or receptacle 30, base 20 and support tray 50 together. As described above, a weighted material may be placed into or removed from the interior 36 of the external support member or receptacle 30 through the access opening 34 of the neck portion 37. The cap 38 also acts to retain the weighted material within the interior 36 of the external support member or receptacle 30.

The cap 38 can comprise a pressure-actuated cap that requires pressure be applied downwardly or on the sides of the cap in order to remove the cap 38 from the neck portion 37 of the external receptacle 30.

Figure 16:
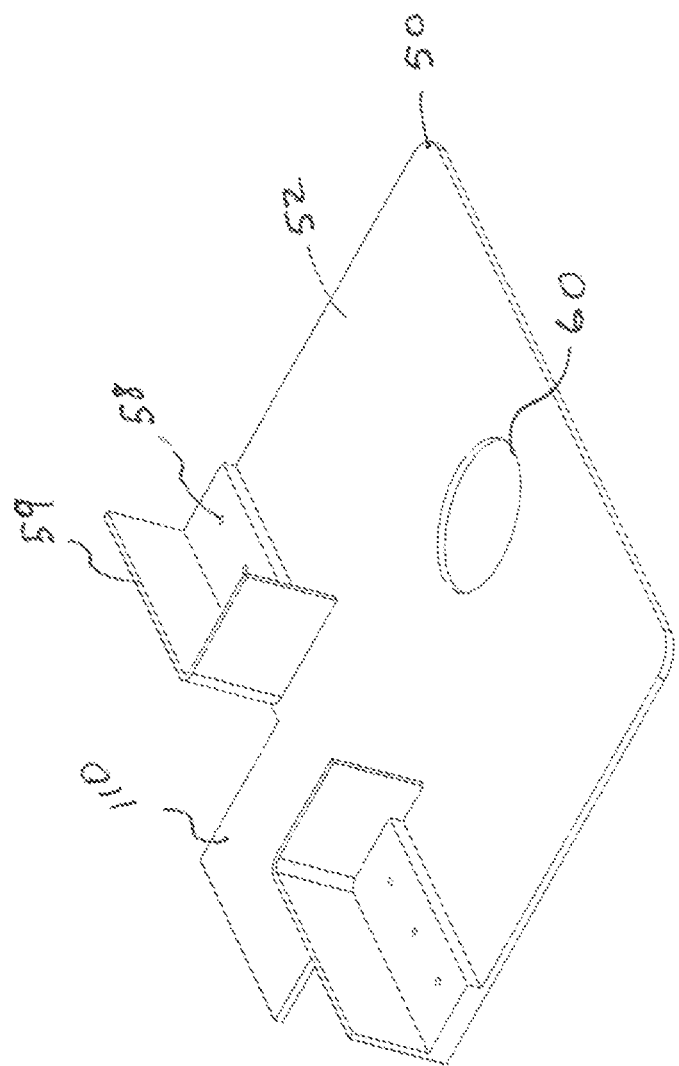
FIG. 16 is a perspective view of a tray of a bait station system having an external weighted reservoir member in accordance with an example embodiment of the invention.
Figure 17:
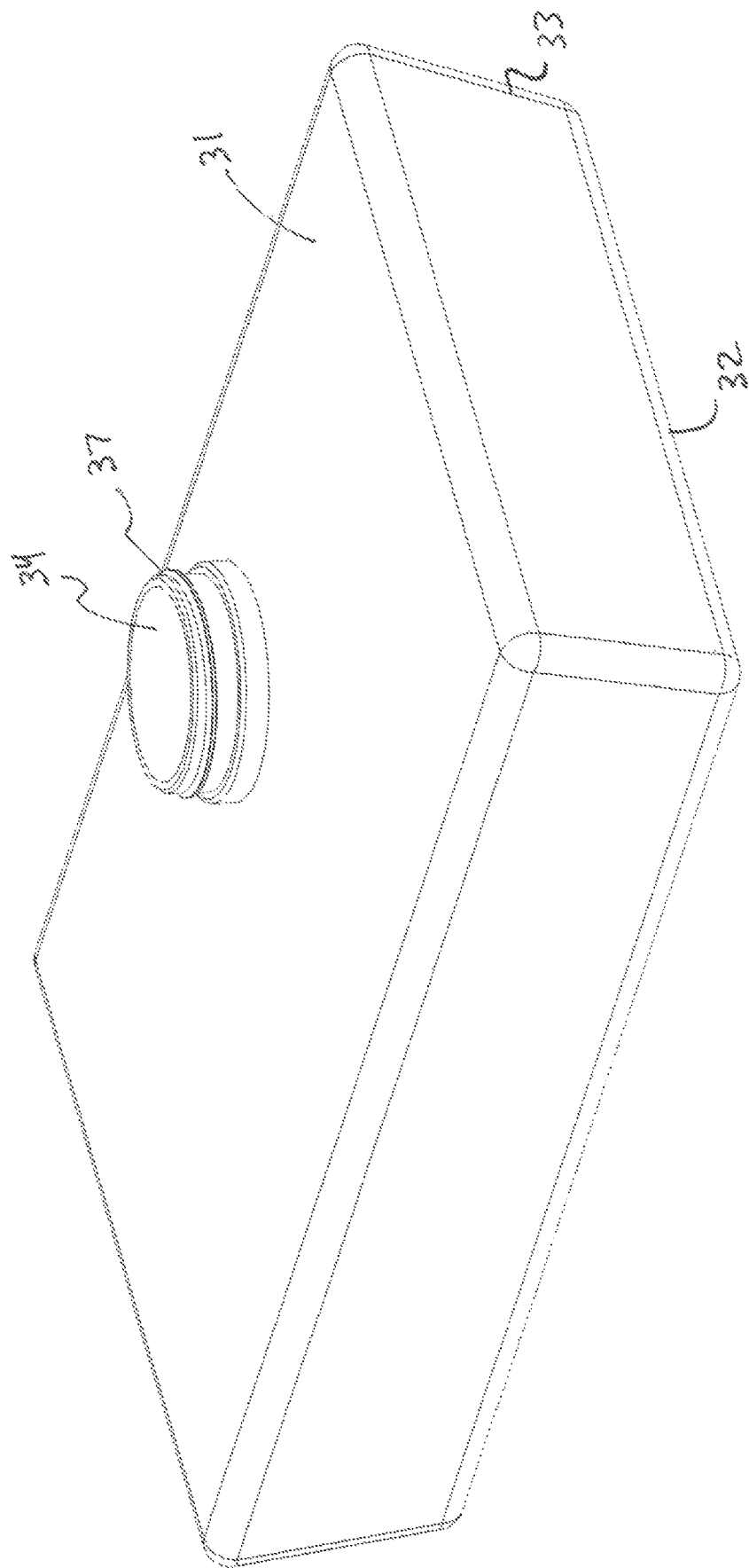
FIG. 17 is a perspective view of an external weighted reservoir of a bait station system in accordance with an example embodiment of the invention.

As illustrated in FIG. 16, the support tray 50 includes an extension portion 110 that extends from the support tray and between the ramps 102a and 102b. The extension portion 110 provides a path to the poison bait for pests entering the ramps 102a and 102b.

In another example embodiment of the present invention, the support tray 50 and the base 20 are fixed or removably coupled together. The tray 50 and base 20 can be fixed together by an adhesive or other bonding mechanism. The tray 50 and base 20 can also be removably coupled together by any conventional coupling mechanism such as pressure fit pins, screws, and the like.

Figure 18:
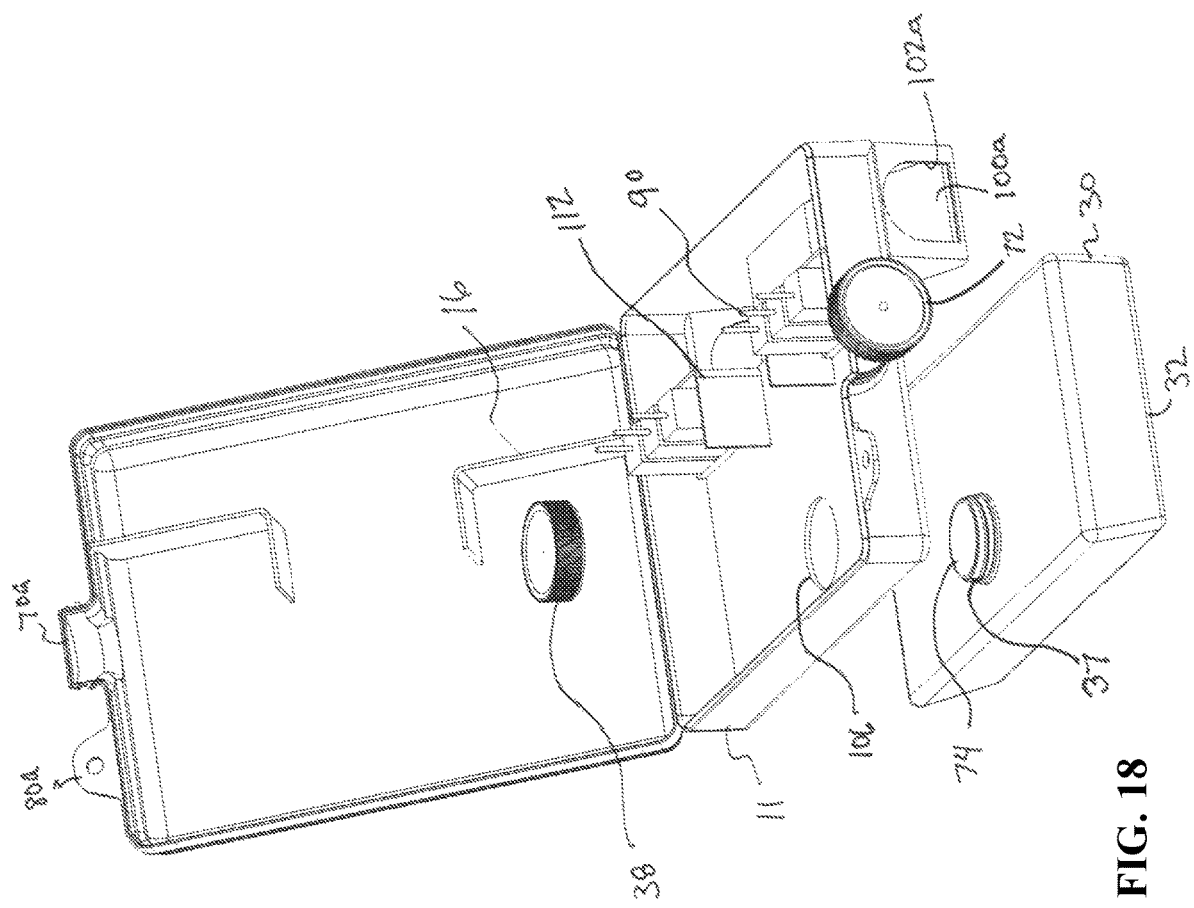
FIG. 18 is a perspective exploded view of bait station and external support receptacle in accordance with an example embodiment of the invention.

In another example embodiment of the invention, as illustrated in FIG. 18, there is no separate tray 50. Instead, the pins 90 that hold the poison bait are fixed or removably inserted into the bottom 22 of the base 20. The base 20 further includes one or more lower divider walls 112 that extend in a generally upward direction from the bottom 22. The lower divider walls 112 provide a barrier between the openings 102a and 102b and the bait stored in the interior 28 of the base 20.

The lower divider walls 112 also act to divide the interior formed between the cover 12 and base 20, to create a path for the rodents, and to make it difficult for rodents or pests to remove the poison from the bait station 10. The lower divider walls 112 may be adjacent to or abut the upper divider walls 16 of the cover or lid 12. The lower divider walls 112 or the upper divider walls 16 may have a height such that they extend or span a distance between the cover or lid 12 and the bottom 22 of the base 20, when the cover or lid 12 is in a closed position.

The bottom 22 of the base 20 may also have elevated portions or platforms on which the bait rests. The elevated portions, which may include the holes 58 for the pins 90 that support or retain the bait, provide additional material of the bottom of the base 20 that may be chewed by a pest consuming the bait. The additional material reduces the likelihood that a pest or rodent will be able to chew through the bottom 22 of the base 20, thereby protecting the support member or receptacle 30.

Figure 19:
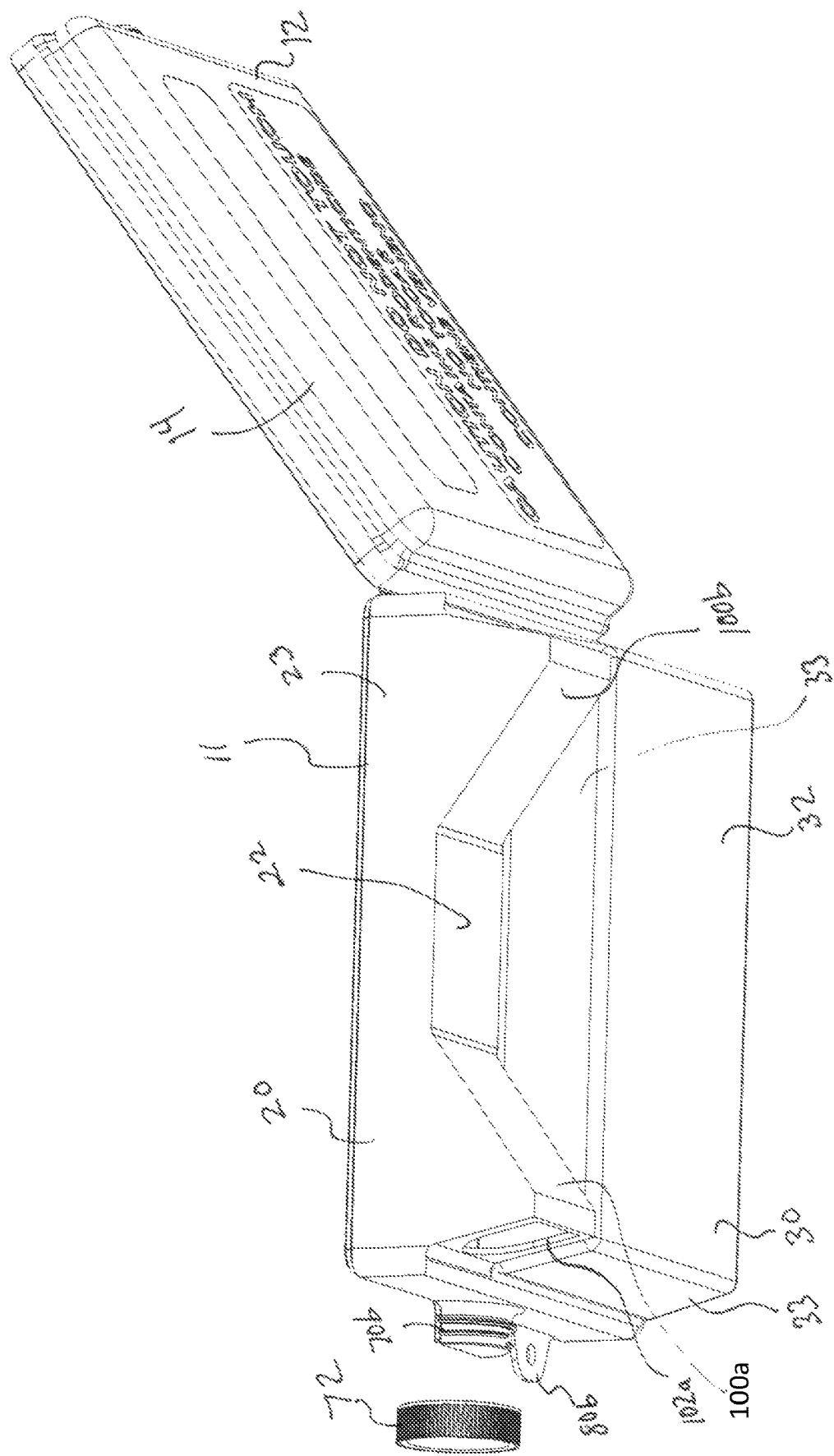
FIG. 19 is a bottom perspective view of a bait station in accordance with an example embodiment of the invention.

Referring to FIG. 19, the ramps 100a and 100b and the peripheral wall 33 of the support member or receptacle 30 form a cutout, recess or gap that is sized and shaped to receive a hand or finger(s) of a user. A user is able to insert one or more fingers into the recess or gap and place their thumb upon the cover or lid 12 in such a way that they are able to pinch or grasp the bait station 10. A user is then able to lift the bait station 10 from the ground or remove it from snow or ice.

As mentioned above, the bait station 10 of the present invention has an optimized configuration or shape that allows it to be easily removed from snow or ice. For instance, the outer surfaces of the ramps 100a and 100b in the recess, and optionally the sides, form an angle with respect to the ground surface so that when ice forms under the bait station 10, the bait station 10 is easily removed from the ice. Additionally, the angle of the ramps 100a and 100b with respect to the ground surface allow the bait station 10 to be forced up or lifted from the ground surface as snow or ice accumulates, expands or contracts. The lifting of the bait station 10 prevents it from becoming stuck to the ground surface.

One or more portions of the peripheral wall 33 of external support member or receptacle 30 are angled outwardly from the bottom 32 to the top 31 of the support member or receptacle 30. The angular configuration of the peripheral wall 33, like the angular orientation of the ramps 100a and 100b, allow the bait station 10 to be forced up or lifted from the ground surface as snow or ice accumulates, expands or contracts.

In use, the external receptacle 30 is placed on the ground surface with the cap 38 removed. A weighted material is then introduced into the access opening 74 to weigh down the support member or receptacle 30. The base 20 of the bait station 10 is then set on the top 31 of the receptacle 30 such that the neck portion 37 extends through the opening 106. In an embodiment of the present invention where the tray 50 is separate from the base 20, the tray 50 is then set in the interior 28 of the base 20 with the neck portion 37 extending through the aperture 60 of the support tray 50. The cap 38 can then be threaded onto the neck portion 37 to close the access opening 74 and secure the base 20, or base 20 and support tray 50 combination, to the external support member or receptacle 30.

Pins 90 are insertable into the holes 58 of the tray 50 or the base 20 and are sized and shaped to receive a commercial poisoned bait block. The cover or lid 12 of the bait station 10 can then be closed so that the latch portions 70a and 70b are aligned and abut each other. The cap 72 is then able to be threaded onto latch portions 70a and 70 to secure the cover or lid 12 in the closed position. The cover or lid 12 can be further secured in the closed position by placing a lock through the tab portions 80a and 80b. Poisoned bait can be replaced by removing the lock and cap 72 from the cover or lid 12. The present invention uses a pressure activated cap (by applying axial pressure or side pressure) so that a child is unable to open the cover or lid 12.

In the event that the base 20 and cover or lid 12, support tray 50, or support member or receptacle 30 become damaged, the bait station 10 can be disassembled and the damaged part or parts replaced. The ability to replace a damaged component provides a cost savings for pest control professionals and homeowners.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A tamper-resistant bait station for holding a poison used to eliminate a pest, the bait station comprising:
    a base having an interior for holding a poison, the base having at least one access opening to permit pest access to the interior, wherein a path to the poison is defined from the at least one access opening into the interior, the base including an incline ramp portion along the path to the poison;
    a cover selectively positionable between an open and closed position with respect to the base to permit access to the interior of the base,
    wherein the base and cover each have a latch portion that are matable together when the cover is in the closed position;
    a cap being threadedly matable to the latch portions, the cap being adapted to resist unthreading absent application of a force axial to a rotational movement of the cap; and
    an external receptacle having an interior adapted to receive a weighted material, the external receptacle being removably securable to a portion of the base.

2. The tamper-resistant bait station of claim 1, wherein the external receptacle includes a securing mechanism operatively coupled thereto to selectively secure the base to the external receptacle.

3. The tamper-resistant bait station of claim 2, wherein the securing mechanism includes a threaded collar extending from the external receptacle and through a portion of the base and a cap removably threadable to the threaded collar to secure the base to the external receptacle.

4. The tamper-resistant bait station of claim 1, further comprising a poison support tray removably positionable in the interior of the base to support the poison.

5. The tamper-resistant bait station of claim 4, wherein the poison support tray includes an extension portion positionable proximate the incline ramp portion, the path to the poison further comprising the extension portion.

6. The tamper-resistant bait station of claim 4, further comprising the external receptacle including a threaded collar securable to a portion of the base and the poison support tray.

7. The tamper-resistant bait station of claim 6, further comprising a cap removably threadable to the threaded collar to secure the base and the tray to the external receptacle.

8. The tamper-resistant bait station of claim 1, wherein the external receptacle has an outwardly extending peripheral wall, wherein a top of the receptacle is wider than a bottom of the receptacle.

9. A tamper-resistant bait station for holding a poison used to eliminate a pest, the bait station comprising:
  a poison support tray able to support the poison to be consumed by the pest;
  a container having an interior to store the poison support tray, the container having a base and a lid that can be opened to access the interior, at least one inclined pest ramp internal to the container and adjacent to an access opening of the container to permit the pest access to the interior,
  wherein the base and lid each have a respective latch portion that mate together when the lid encloses the interior of the container;
  a cap being threadedly matable to each of the respective latch portions, the cap being adapted to resist unthreading absent application of a force axial to a rotational movement of the cap; and
  an external support member that is able to support the base above a ground surface, the external support member having a securing member extendable through and securable to portions of the base and poison support tray to prevent separation of the base and poison support tray from the support member.

10. The tamper-resistant bait station of claim 9, wherein the securing member includes an access opening to an interior of the external support member that permits selective placement of a weighted material into the interior of the external support member to restrict movement of the external support member; and
  a cap that is selectively matable with a portion of the securing member to selectively cover the access opening.

11. The tamper-resistant bait station of claim 10, wherein the securing member further comprises a collar extending from the access opening and through an opening in the base and an aperture in the poison support tray, wherein the cap is securable to the collar to limit access to the interior of the external support member and to permit a filling of the external support member with the weighted material without removal of the poison support tray or base.

12. The tamper-resistant bait station of claim 9, wherein the external support member has an outwardly extending peripheral wall, wherein a top of the support member is wider than a bottom of the support member.

13. A tamper-resistant bait station for holding a poison used to eliminate a pest, the bait station comprising:
  a base having an interior for holding a poison, the base having at least one access opening to permit pest access to the interior, wherein a path to the poison is defined from the at least one access opening into the interior, the base including an incline ramp portion along the path to the poison;
  a cover selectively positionable between an open and closed position with respect to the base to permit access to the interior of the base; and
  an external receptacle having an interior adapted to receive a weighted material, the external receptacle being removably securable to a portion of the base,
  wherein the external receptacle includes a securing mechanism operatively coupled thereto to selectively secure the base to the external receptacle, and
  wherein the securing mechanism includes a threaded collar extending from the external receptacle and through a portion of the base and a cap removably threadable to the threaded collar to secure the base to the external receptacle.

14. The tamper-resistant bait station of claim 13, further comprising a poison support tray removably positionable in the interior of the base to support the poison.

15. The tamper-resistant bait station of claim 14, wherein the poison support tray includes an extension portion positionable proximate the incline ramp portion, the path to the poison further comprising the extension portion.

16. The tamper-resistant bait station of claim 14, further comprising the threaded collar securable to the poison support tray.

17. The tamper-resistant bait station of claim 16, further comprising the cap removably threadable to the threaded collar to secure the tray to the external receptacle.

18. The tamper-resistant bait station of claim 13, wherein the external receptacle has an outwardly extending peripheral wall, wherein a top of the receptacle is wider than a bottom of the receptacle.

* * * * *